US011192468B2

(12) United States Patent
Kritzmacher et al.

(10) Patent No.: US 11,192,468 B2
(45) Date of Patent: Dec. 7, 2021

(54) ELECTRIC VEHICLE PRE-CONDITIONING (71) Applicant: GM Global Technology Operations LLC, Detroit, MI (US)

(72) Inventors: Charles J. Kritzmacher, Ann Arbor, MI (US); Adam M. Piper, White Lake, MI (US); Bryan N. Roos, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 306 days.

(21) Appl. No.: 16/413,167

(22) Filed: May 15, 2019

(65) Prior Publication Data

US 2020/0361341 A1    Nov. 19, 2020

(51) Int. Cl.
*B60L 58/24* (2019.01)
*B60L 53/66* (2019.01)
*G07C 5/08* (2006.01)
*G06Q 20/32* (2012.01)

(52) U.S. Cl.
CPC .......... *B60L 58/24* (2019.02); *B60L 53/665* (2019.02); *G07C 5/085* (2013.01); *B60Y 2200/91* (2013.01); *G06Q 20/325* (2013.01)

(58) Field of Classification Search
None
See application file for complete search history.

(56) References Cited

U.S. PATENT DOCUMENTS

| | | | | |
|---|---|---|---|---|
| 5,819,864 A | * | 10/1998 | Koike | G01R 31/3648 180/65.1 |
| 8,860,362 B2 | * | 10/2014 | Kamen | B60L 53/00 320/104 |
| 8,954,094 B1 | * | 2/2015 | Mishra | H04W 4/02 455/456.3 |
| 9,869,726 B2 | * | 1/2018 | Zumstein | G01R 31/3835 |
| 10,182,316 B1 | * | 1/2019 | Tu | H04W 4/40 |
| 10,650,621 B1 | * | 5/2020 | King | H04L 67/10 |

(Continued)

FOREIGN PATENT DOCUMENTS

CN    109861333 A  *  6/2019

OTHER PUBLICATIONS

Machine Translation of Google patents Japanese Patent Pub No. JP2005011757A.*

(Continued)

*Primary Examiner* — Jean Paul Cass (57) ABSTRACT

A method of prompting an operator of an electric vehicle for pre-conditioning the electric vehicle comprises monitoring a location of the electric vehicle, monitoring the temperature of an electric propulsion system within the electric vehicle, accessing historical data of driving patterns for the electric vehicle, monitoring the location of the operator of the electric vehicle, identifying a condition that indicates imminent usage of the electric vehicle based on the location of the vehicle, the location of the operator of the electric vehicle, and the historical data of driving patterns for the electric vehicle, comparing the temperature of the electric propulsion system of the electric vehicle to a pre-determined preferred operating temperature, and sending a prompt to the operator of the electric vehicle suggesting that pre-conditioning of the electric vehicle may be appropriate.

11 Claims, 3 Drawing Sheets

(56) References Cited

U.S. PATENT DOCUMENTS

| | | | | |
|---|---|---|---|---|
| 2005/0134504 A1* | 6/2005 | Harwood | ............ | H04M 1/6091 |
| | | | | 342/357.74 |
| 2011/0025267 A1* | 2/2011 | Kamen | .................. | B60L 55/00 |
| | | | | 320/109 |
| 2012/0271758 A1* | 10/2012 | Jammer | .................. | B60L 53/57 |
| | | | | 705/39 |
| 2013/0009599 A1* | 1/2013 | Yukizane | ............ | H02J 13/0062 |
| | | | | 320/109 |
| 2014/0309885 A1* | 10/2014 | Ricci | .................... | G06F 3/0482 |
| | | | | 701/41 |
| 2015/0084757 A1* | 3/2015 | Annibale | ............. | G08B 25/016 |
| | | | | 340/436 |
| 2016/0017534 A1* | 1/2016 | Yu | ........................... | D06F 58/20 |
| | | | | 34/427 |
| 2017/0305349 A1* | 10/2017 | Naboulsi | ................. | B60R 1/025 |
| 2018/0156623 A1* | 6/2018 | West | .................. | G01C 21/3423 |

OTHER PUBLICATIONS

Machine Translation of Google patents Japanese Patent Pub No. JPH11178231A.*

NPL, Wang, Qin, et al., A critical review of thermal models and solutions for lithium ion batteries for the development of pure electric vehicles, Renewable and Sustainable Energy review 63 (2016) 106-128 (https://reader.elsevier.com/reader/sd/pii/S1364032116301435?token=98ADC7F73B577D5B6FD0E27FB8656EFCF78307B30A7.*

* cited by examiner

ELECTRIC VEHICLE PRE-CONDITIONING

INTRODUCTION

The present disclosure relates to a system and method of providing a prompt to the operator of an electric vehicle allowing the operator to initiate pre-conditioning of the electric vehicle.

Electric vehicles are powered by electric motors that run on electricity stored in rechargeable lithium-ion or Nickel Metal Hydride Batteries. One disadvantage of electrical batteries is that batteries are less efficient and provide less power when they are cold. Automobiles are likely to encounter varying temperatures depending on where and how they are used. It is possible, and even likely, that an electric vehicle will be used in a climate where temperatures are cold. Operation of an electric vehicle in temperatures that are less than optimal means the batteries will operate less efficiently. The vehicle electrical requirements do not change in cold temperatures, and in fact, may increase in cold temperatures due to increased HVAC loads. Therefore, when an electric vehicle is operated in very cold temperatures, particularly when first started, when the power output of the batteries and the life of the battery is negatively affected.

To combat this, systems have been developed to warm the batteries before use. In this way, when the electric vehicle is put into use, the batteries are already warm and operate at peak efficiency and power output. In many instances, systems include capability to allow the operator of an electric vehicle to initiate pre-conditioning of the electric vehicle by warming the batteries ahead of time. A key fob, similar to a remote starter device for an internal combustion engine vehicle, may be used to allow the operator of an electric vehicle to initiate pre-conditioning prior to usage of the electric vehicle.

Existing systems depend on foresight of the operator to predict when usage of the electric vehicle is imminent and initiate pre-conditioning of the electric vehicle. Thus, while current systems achieve their intended purpose, there is a need for an improved system that automatically predicts when usage of the electric vehicle may be imminent and provides a prompt to the operator of the vehicle to initiate pre-conditioning.

SUMMARY

According to several aspects, of the present disclosure, a method of prompting an operator of an electric vehicle for pre-conditioning the electric vehicle, comprises monitoring a location of the electric vehicle, monitoring the temperature of an electric propulsion system within the electric vehicle, accessing historical data of driving patterns for the electric vehicle, monitoring the location of the operator of the electric vehicle, identifying a condition that indicates imminent usage of the electric vehicle based on the location of the vehicle, the location of the operator of the electric vehicle, and the historical data of driving patterns for the electric vehicle, comparing the temperature of the electric propulsion system of the electric vehicle to a pre-determined preferred operating temperature, and sending a prompt to the operator of the electric vehicle suggesting that pre-conditioning of the electric vehicle may be appropriate.

According to another aspect of the present disclosure, monitoring the location of the operator of the electric vehicle, further includes accessing a personal device belonging to the operator of the vehicle, and using GPS capability within the personal device to monitor the location of the operator of the electric vehicle.

According to another aspect of the present disclosure, a personal device belonging to the operator of the vehicle, and using GPS capability within the personal device to monitor the location of the operator of the electric vehicle, further includes accessing one of an operator's cell phone, smart phone, tablet, laptop computer, and smart watch.

According to another aspect of the present disclosure, identifying a condition that indicates imminent usage of the electric vehicle based on the location of the vehicle, the location of the operator of the electric vehicle, and the historical data of driving patterns for the electric vehicle, further includes monitoring the arrival of the electric vehicle at a public transportation hub, monitoring movement of the operator of the electric vehicle from the public transportation hub to at least one location distant from the public transportation hub, while the electric vehicle remains located at the public transportation hub, and monitoring the return of the operator of the electric vehicle to the public transportation hub.

According to another aspect of the present disclosure, monitoring the arrival of the electric vehicle at a public transportation hub, includes monitoring the arrival of the electric vehicle at one of an airport, a bus depot, a train station, car rental agency, and a cruise ship dock.

According to another aspect of the present disclosure, the method further includes accessing the operator's personal device and identifying travel plans from the operator's personal calendar or uploaded itineraries, and monitoring the return of the operator of the electric vehicle to the public transportation hub further includes predicting the return of the operator of the electric vehicle to the public transportation hub based on data from the operator's personal calendar and uploaded itineraries.

According to another aspect of the present disclosure, identifying a condition that indicates imminent usage of the electric vehicle based on the location of the vehicle, the location of the operator of the electric vehicle, and the historical data of driving patterns for the electric vehicle, further includes monitoring movement of the electric vehicle to a destination, accessing the operator's personal device, identifying travel plans from the operator's personal calendar or uploaded itineraries, and predicting how long the operator of the electric vehicle will remain at the destination based on data from the operator's personal calendar and uploaded itineraries.

According to another aspect of the present disclosure, identifying a condition that indicates imminent usage of the electric vehicle based on the location of the vehicle, the location of the operator of the electric vehicle, and the historical data of driving patterns for the electric vehicle, further includes prompting the operator of the electric vehicle for planned departure time, receiving input from the operator of the vehicle of the planned departure time, and predicting how long the operator of the electric vehicle will remain at the destination based on the planned departure time received from the driver of the electric vehicle.

According to another aspect of the present disclosure, identifying a condition that indicates imminent usage of the electric vehicle based on the location of the vehicle, the location of the operator of the electric vehicle, and the historical data of driving patterns for the electric vehicle, further includes monitoring movement of the electric vehicle to a destination, identifying the destination, and predicting how long the operator of the electric vehicle will remain at the destination.

According to another aspect of the present disclosure, predicting how long the operator of the electric vehicle will remain at the destination further includes accessing historical data, identifying past instances where the electric vehicle and the operator traveled to the destination, calculating an average time that the operator spends at the destination, and predicting how long the operator of the electric vehicle will remain at the destination based on the average time the operator of the electric vehicle spends at the destination.

According to another aspect of the present disclosure, predicting how long the operator of the electric vehicle will remain at the destination further includes accessing information from the internet, identifying the nature of the activity at the destination, calculating an average length of time for the identified activity to conclude based on data from the internet, and predicting how long the operator of the electric vehicle will remain at the destination based on the average length of time for the identified activity to conclude.

According to another aspect of the present disclosure, predicting how long the operator of the electric vehicle will remain at the destination further includes accessing the operator's personal device, monitoring financial transactions and electronic payments made by the operator using the personal device, identifying a payment made at the destination, and predicting how long the operator of the electric vehicle will remain at the destination based on identifying a payment made by the operator at the destination.

According to another aspect of the present disclosure, predicting how long the operator of the electric vehicle will remain at the destination further includes detecting when the electric vehicle is plugged in at a charging station, monitoring when charging of the electric vehicle stops, and predicting how long the operator of the electric vehicle will remain at the charging station based on charging of the electric vehicle stopping.

According to another aspect of the present disclosure, predicting how long the operator of the electric vehicle will remain at the destination further includes detecting when the electric vehicle is parked at a public parking facility, accessing a parking application on the operator's personal device, monitoring when a pre-paid parking time will expire, and predicting how long the operator of the electric vehicle will remain at the charging station based on pending expiration of the pre-paid parking time.

According to another aspect of the present disclosure, identifying a condition that indicates imminent usage of the electric vehicle based on the location of the vehicle, the location of the operator of the electric vehicle, and the historical data of driving patterns for the electric vehicle, further includes accessing the operator's personal device, identifying recurring planned departures from the operator's personal calendar, and predicting future departures based on data from the operator's personal calendar.

According to another aspect of the present disclosure, identifying a condition that indicates imminent usage of the electric vehicle based on the location of the vehicle, the location of the operator of the electric vehicle, and the historical data of driving patterns for the electric vehicle, further includes identifying patterns of past recurring departures from the historical data, and predicting future departures based on patterns of recurring past departures.

According to several aspects of the present disclosure, a system for providing a pre-conditioning prompt to an operator of an electric vehicle comprises a controller in communication with the electric vehicle and the operator of the electric vehicle, an operator interface adapted to allow the operator of the electric vehicle to communicate with the controller, the controller adapted to track the position of the electric vehicle, track the position of the operator of the electric vehicle, access historical data, access weather information, and send a prompt to the operator of the electric vehicle when the controller identifies conditions indicating use of the electric vehicle is imminent and the temperature where the electric vehicle is located necessitates pre-conditioning of an electric propulsion system within the electric vehicle.

According to another aspect of the present disclosure, the controller communicates with a personal device belonging to the operator of the vehicle, and uses GPS capability within the personal device to monitor the location of the operator of the electric vehicle and send a prompt to the operator of the electric vehicle when the controller identifies conditions indicating use of the electric vehicle is imminent and the temperature where the electric vehicle is located necessitates pre-conditioning of an electric propulsion system within the electric vehicle.

According to another aspect of the present disclosure, the operator interface is integral to the personal device, further wherein the operator of the electric vehicle communicates with the controller and responds to prompts from the controller through the operator interface of the personal device.

According to another aspect of the present disclosure, the personal device is one of an operator's cell phone, smart phone, tablet, laptop computer, and smart watch.

According to another aspect of the present disclosure, the controller is further adapted to communicate with the internet via a cellular network, further wherein the controller is adapted to access information from the internet to identify the nature of an activity at a destination, calculate an average length of time for the identified activity to conclude based on data from the internet, and predict how long the operator of the electric vehicle will remain at the destination based on the average length of time for the identified activity to conclude.

According to another aspect of the present disclosure, the controller is adapted to store historical data of past driving and travel patterns for the electric vehicle and the operator of the electric vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
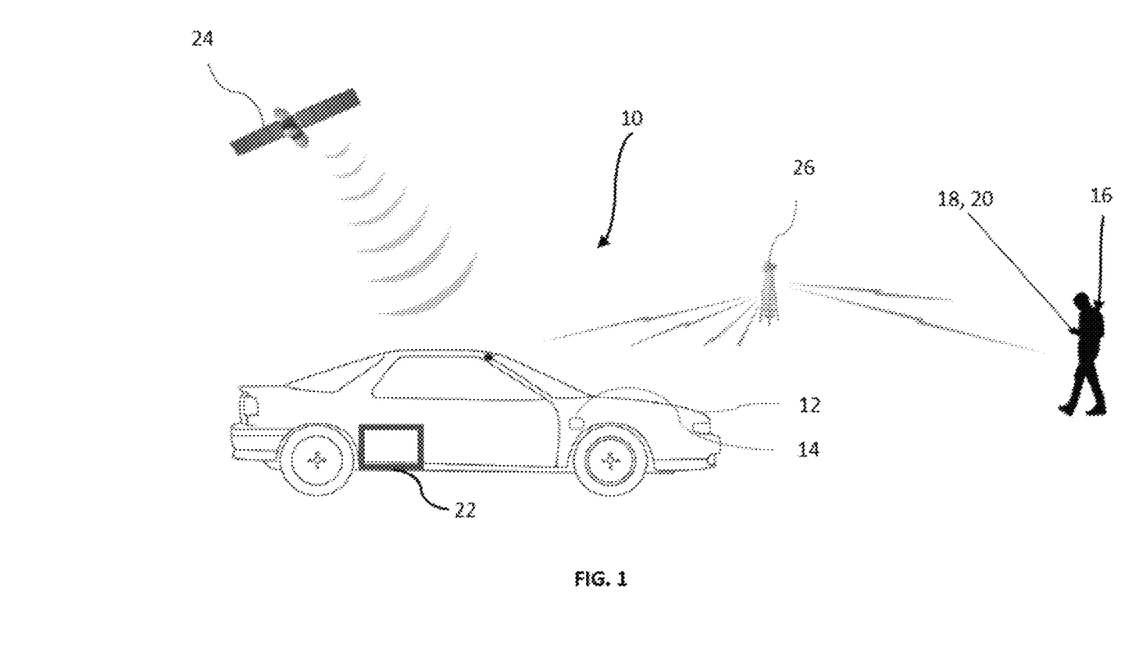
FIG. 1 is a schematic view of a system according to an exemplary embodiment of the present disclosure.

Referring to FIG. 1, a system 10 for providing a pre-conditioning prompt to an operator of an electric vehicle 12 comprises a controller 14 in communication with the electric vehicle 12 and the operator 16 of the electric vehicle 12. An operator interface 18 is adapted to allow the operator 16 of the electric vehicle 12 to communicate with the controller 14.

The controller 14 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The operator interface 18 is integral to a personal device 20 belonging to and carried by the operator 16 of the electric vehicle 12. The operator 16 of the electric vehicle 12 communicates with the controller 14 and is able to respond to prompts from the controller 14 through the operator interface 18 of the personal device 20. The personal device 20 may be any device adapted to allow two-way communication between the operator 16 of the electric vehicle 12 and the electric vehicle 12, such as an operator's cell phone, smart phone, tablet, laptop computer, or smart watch.

The controller 14 is adapted to track the position of the electric vehicle 12, track the position of the operator 16 of the electric vehicle 12, access historical data, access weather information, and send a prompt to the operator 16 of the electric vehicle 12 when the controller 14 identifies conditions indicating use of the electric vehicle 12 is imminent, or likely to happen soon, and the temperature where the electric vehicle 12 is located necessitates pre-conditioning of an electric propulsion system 22 within the electric vehicle 12.

The system 10 utilizes GPS 24 and GPS capability within the personal device 20 to track the location of the operator 16 of the electric vehicle 12, and communication between the electric vehicle 12 and the personal device 20 is over a cellular network 26. The cellular network 26 is a radio network distributed over land through cells where each cell includes a fixed location transceiver known as a base station. These cells together provide radio coverage over larger geographical areas. Equipment, such as mobile phones, are therefore able to communicate even if the equipment is moving through cells during transmission.

Further, the controller 14 is adapted to access information from the internet to identify the nature of an activity at a destination, and calculate an average length of time for the identified activity to conclude based on data from the internet. Using the calculated average length of time for the identified activity to conclude, the controller 14 can predict how long the operator of the electric vehicle 12 will remain at the destination. The controller 14 also uses information from the internet to determine weather conditions.

In addition, the controller 14 is adapted to store historical data of past driving and travel patterns for the electric vehicle 12 and the operator 16 of the electric vehicle 12. The controller 14 can use stored historical data to predict travel patterns and the length of time the operator 16 of the electric vehicle 12 will remain at a location based on past patterns.

Figure 2:
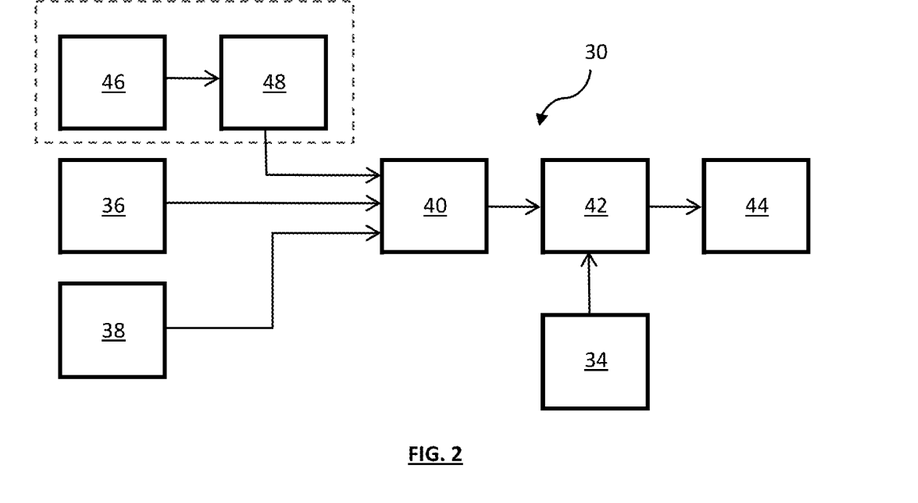
FIG. 2 is a schematic view of a method according to an exemplary embodiment of the present disclosure.

Referring to FIG. 2, a method 30 of prompting an operator 16 of an electric vehicle 12 for pre-conditioning the electric vehicle 12, comprises monitoring 32 a location of the electric vehicle 12, monitoring 34 the temperature of the electric propulsion system 22 within the electric vehicle 12, accessing 36 historical data of driving patterns for the electric vehicle 12, monitoring 38 the location of the operator 16 of the electric vehicle 12, and identifying 40 a condition that indicates imminent usage of the electric vehicle 12 based on the location of the vehicle 12, the location of the operator 16 of the electric vehicle 12, and the historical data of driving patterns for the electric vehicle.

Once a condition of imminent usage of the electric vehicle is identified 40, the controller 14 compares 42 the temperature of the electric propulsion system 22 of the electric vehicle 12 to a pre-determined preferred operating temperature. Operation of the electric propulsion system below established preferred operating temperatures results in less efficiency, lower power output and shorter battery life. Therefore, it is important that the electric vehicle 12, and particularly the batteries of the electric propulsion system 22, be operated above the pre-determined preferred operating temperature.

If the temperature of the propulsion system 22 within the electric vehicle 12 is below the pre-determined preferred operating temperature, the controller 14 sends 44 a prompt to the operator 16 of the electric vehicle 12 suggesting that pre-conditioning of the electric vehicle 12 may be appropriate. The operator has the option, once prompted 44, to respond to the controller 14 via the operator interface 18, and initiate pre-conditioning of the electric propulsion system 22.

The system 10 monitors 32 the location of the operator 16 of the electric vehicle 12 by accessing 46 the personal device 20 belonging to the operator 16 of the vehicle 12, and using 48 GPS capability within the personal device 20 to monitor 32 the location of the operator 16 of the electric vehicle 12.

Figure 3:
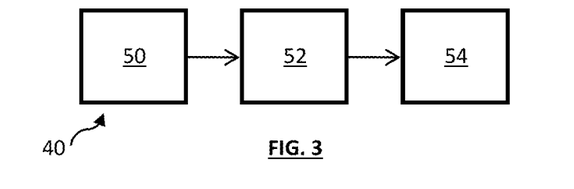
FIG. 3 is a schematic view according to another exemplary embodiment of the present disclosure.

Referring to FIG. 3, in an exemplary embodiment, the controller 14 identifies 40 a condition that indicates imminent usage of the electric vehicle 12 by monitoring 50 the arrival of the electric vehicle 12 at a public transportation hub. After the electric vehicle 12 arrives at a public transportation hub, such as, by way of non-limiting example, an airport, a bus depot, a train station, car rental agency, or a cruise ship dock, the controller monitors 52 movement of the operator 16 of the electric vehicle 12 from the public transportation hub to at least one location distant from the public transportation hub. The controller continues to monitor 52 movement of the operator 16 of the electric vehicle 12, while the electric vehicle 12 remains located at the public transportation hub. The controller further monitors 54 the return of the operator 16 of the electric vehicle 12 to the public transportation hub.

Monitoring 54 the return of the operator 16 to the electric vehicle 12 after traveling to another destination via public transportation may be an indication that the operator 16 of the electric vehicle 12 is on route back to the electric vehicle 12 to leave the public transportation hub. If temperature conditions warrant, the controller will send 44 a prompt to the operator 16 of the electric vehicle 12, giving the operator the opportunity to initiate pre-conditioning of the electric vehicle 12.

Figure 4:
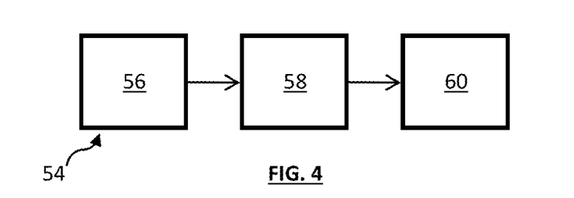
FIG. 4 is a schematic view according to another exemplary embodiment of the present disclosure.

Referring to FIG. 4, in another exemplary embodiment, the controller 14 accesses 56 the personal device 20, identifies 58 travel plans from the personal calendar or uploaded itineraries of the operator 16 of the electric vehicle 12, and predicts 60 the return of the operator 16 of the electric vehicle 12 to the public transportation hub based on data from the personal calendar and uploaded itineraries of the operator 16.

Figure 5:
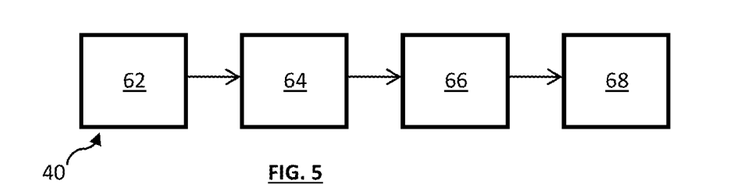
FIG. 5 is a schematic view according to another exemplary embodiment of the present disclosure.

Referring to FIG. 5, in another exemplary embodiment, the controller 14 identifies 40 a condition that indicates imminent usage of the electric vehicle 12 by monitoring 62 movement of the electric vehicle 12 to a destination, accessing 64 the personal device 20 of the operator 16, identifying 66 travel plans from the operator's personal calendar or uploaded itineraries, and predicting 68 how long the operator 16 of the electric vehicle 12 will remain at the destination based on data from the operator's personal calendar and uploaded itineraries.

Figure 6:
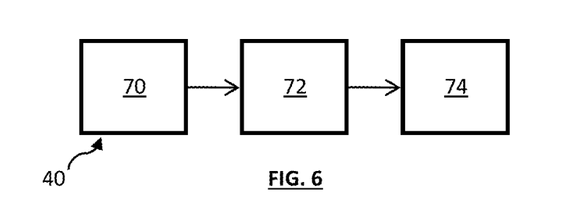
FIG. 6 is a schematic view according to another exemplary embodiment of the present disclosure.

Referring to FIG. 6, in another exemplary embodiment, the controller 14 identifies 40 a condition that indicates imminent usage of the electric vehicle 12 by prompting 70 the operator 16 of the electric vehicle 12 for planned departure time, receiving 72 input from the operator 16 of the electric vehicle 12 of the planned departure time, and predicting 74 how long the operator 16 of the electric vehicle 12 will remain at the destination based on the planned departure time received from the operator 16 of the electric vehicle 12. This allows the operator 16 of the electric vehicle 12 to input information to the controller 14 ahead of time, so the controller 14 has an accurate time when the operator should be prompted 44 to pre-condition the electric vehicle 12.

Figure 7:
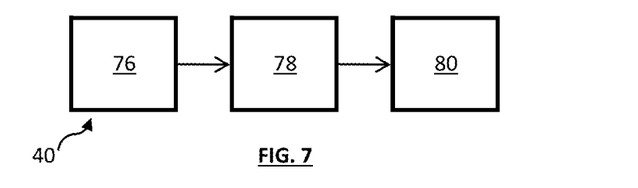
FIG. 7 is a schematic view according to another exemplary embodiment of the present disclosure.

Referring to FIG. 7, in another exemplary embodiment, the controller 14 identifies 40 a condition that indicates imminent usage of the electric vehicle 12 by monitoring 76 movement of the electric vehicle 12 to a destination, identifying 78 the destination, and predicting 80 how long the operator 16 of the electric vehicle 12 will remain at the destination.

By way of a non-limiting example, the electric vehicle 12 may arrive at a charging station. The controller 14 of the electric vehicle 12 monitors the systems within the electric vehicle 12, so the controller 14 knows when the electric vehicle 12 is plugged in, if charging is taking place, and if charging stops. If an electric vehicle 12 is at a public charging station and detects that charging has stopped, the controller 14 can predict that the operator of the electric vehicle 12 will likely be returning to the electric vehicle 12 soon to move it from the public charging station.

Charging may stop due to the electric vehicle 12 being completely charged, or when the time allotted by the charging station has expired. In either instance, timed charging stations may be treated like a parking meter, where if an electric vehicle 12 is left at a public charging station after the allotted time has expired, or after charging of the electric vehicle 12 is complete, the electric vehicle 12 may be ticketed. Therefore, when the controller 14 detects that the electric vehicle 12 is fully charged, or that charging has stopped, the controller 14 can predict that the operator of the electric vehicle 12 will likely return soon to move the electric vehicle 12 from the charging station.

Figure 8:
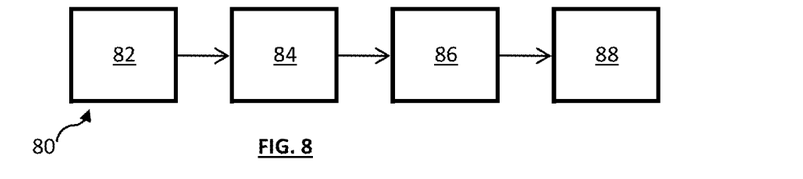
FIG. 8 is a schematic view according to another exemplary embodiment of the present disclosure.

Referring to FIG. 8, in another exemplary embodiment, the controller predicts 80 how long the operator 16 of the electric vehicle 12 will remain at the destination by accessing 82 historical data, identifying 84 past instances where the electric vehicle 12 and the operator 16 traveled to the destination, calculating 86 an average time that the operator 16 spends at the destination, and predicting 88 how long the operator 16 of the electric vehicle 12 will remain at the destination based on the average time the operator 16 of the electric vehicle 12 spends at the destination.

By way of non-limiting example, the operator may travel to a hair salon. The controller 14 identifies 78 the destination is a hair salon. The controller 14 accesses 82 historical data to look for other instances where the operator 16 and the electric vehicle 12 traveled to the hair salon. The controller 14 calculates that the operator 16 spends, on average, forty-five minutes at the hair salon. Based on that average time, the controller 14 predicts 88 that the operator 16 will remain at the hair salon for approximately forty-five minutes, and sends 44 a prompt to the operator 16 after forty minutes, giving the operator 16 the opportunity to initiate pre-conditioning of the electric vehicle 12.

By way of another non-limiting example, the operator may travel to a frequently travelled location to charge the electric vehicle 12. The controller 14 may identify that the electric vehicle 12 is at a charging station based on GPS, or alternatively, the controller 14 may detect the electric vehicle 12 is at a charging station by detecting when the electric vehicle 12 is plugged in and charging commences. The controller 14 can predict, based on data from previous charging events, how long the electric vehicle 12 will likely be plugged in before the electric vehicle 12 will once again be used. The controller 14 may also detect when charging of the electric vehicle 12 is near completion by monitoring the level of charge in the electric vehicle 12.

Figure 9:
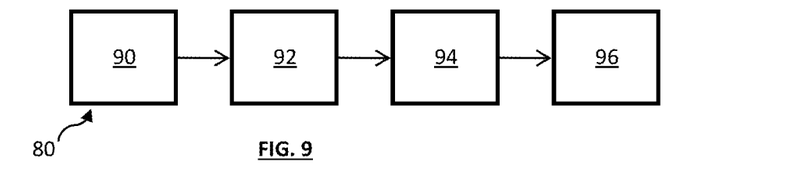
FIG. 9 is a schematic view according to another exemplary embodiment of the present disclosure.

Referring to FIG. 9, in another exemplary embodiment, the controller predicts 80 how long the operator 16 of the electric vehicle 12 will remain at the destination by accessing 90 information from the internet, identifying 92 the nature of the activity at the destination, calculating 94 an average length of time for the identified activity to conclude based on data from the internet, and predicting 96 how long the operator 16 of the electric vehicle 12 will remain at the destination based on the average length of time for the identified activity to conclude.

By way of non-limiting example, the operator may travel to a hair salon. The controller 14 identifies 78 the destination is a hair salon. The controller 14 accesses 90 the internet to identify the type of activity that takes place at the hair salon and how long such activity generally takes. The controller determines from internet data that the most common activity at the hair salon is a hair cut, and on average, a hair cut takes approximately twenty-five minutes. Based on that average time, the controller 14 predicts 96 that the operator 16 will remain at the hair salon for approximately twenty-five minutes, and sends 44 a prompt to the operator 16 after twenty minutes, giving the operator 16 the opportunity to initiate pre-conditioning of the electric vehicle 12.

Figure 10:
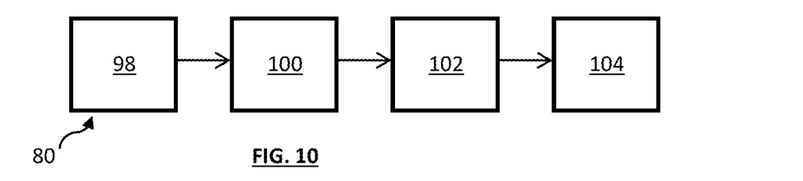
FIG. 10 is a schematic view according to another exemplary embodiment of the present disclosure.

Referring to FIG. 10, in another exemplary embodiment, the controller predicts 80 how long the operator 16 of the electric vehicle 12 will remain at the destination by accessing 98 the operator's personal device 20, monitoring 100 financial transactions and electronic payments made by the operator 16 using the personal device 20, identifying 102 a payment made at the destination, and predicting 104 how long the operator 16 of the electric vehicle 12 will remain at the destination based on identifying 102 a payment made by the operator 16 at the destination.

By way of non-limiting example, the operator may travel to a hair salon. The controller 14 identifies 78 the destination is a hair salon. The controller 14 accesses 98 the personal device 20 of the operator 16 and monitors 100 electronic payments made by the operator 16. The controller identifies 102 that an electronic payment has been made by the operator 16 at the destination. Based on a payment being made by the operator 16, the controller 14 predicts 104 that the operator 16 may soon depart and sends 44 a prompt to the operator 16, giving the operator 16 the opportunity to initiate pre-conditioning of the electric vehicle 12.

In another exemplary embodiment, the controller predicts how long the operator of the electric vehicle will remain at the destination by detecting when the electric vehicle is parked at a public parking facility, accessing a parking application on the operator's personal device, monitoring when a pre-paid parking time will expire, and predicting how long the operator of the electric vehicle will remain at the charging station based on pending expiration of the pre-paid parking time.

By way of non-limiting example, the operator may travel to a hair salon. The controller 14 identifies that the electric vehicle has been parked at the public parking lot across the street from the hair salon. The controller 14 accesses a parking application on the personal device 20 of the operator 16 and monitors electronic payments made by the operator 16. The controller identifies that an electronic payment has been made by the operator 16 to pay for thirty minutes of parking at the public parking lot. Based on a payment being made by the operator 16 for a pre-determined amount of time, thirty minutes, the controller 14 predicts that the operator 16 may depart after thirty minutes and sends 44 a prompt to the operator 16, giving the operator 16 the opportunity to initiate pre-conditioning of the electric vehicle 12 ahead of time.

Figure 11:
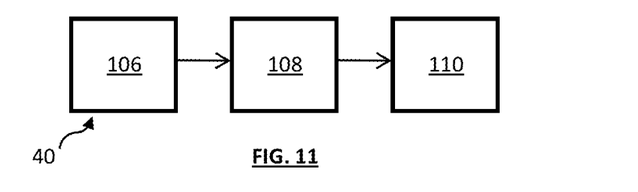
FIG. 11 is a schematic view according to another exemplary embodiment of the present disclosure.

Referring to FIG. 11, in another exemplary embodiment, the controller 14 identifies 40 a condition that indicates imminent usage of the electric vehicle 12 by accessing 106 the operator's personal device 20, identifying 108 recurring planned departures from the personal calendar on the personal device 20, and predicting 110 future departures based on data from the operator's personal calendar.

Figure 12:
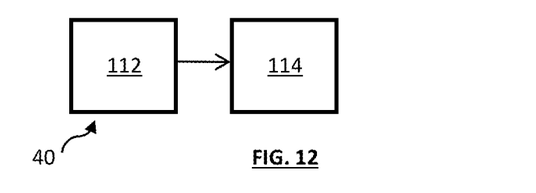
FIG. 12 is a schematic view according to another exemplary embodiment of the present disclosure.

Referring to FIG. 12, in another exemplary embodiment, the controller 14 identifies 40 a condition that indicates imminent usage of the electric vehicle 12 by identifying 112 patterns of past recurring departures from the historical data and predicting 114 future departures based on patterns of recurring past departures.

By way of non-limiting example, the operator 16 of the electric vehicle goes to the hair salon on the first Tuesday of every month at 2:00 p.m. The controller identifies 112 this recurring pattern, and based on the recurring pattern, sends 44 a prompt to the operator 16 of the electric vehicle at 1:50 p.m. on the first Tuesday of the following month.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of prompting an operator of an electric vehicle for pre-conditioning the electric vehicle by warming the electric propulsion system prior to usage, comprising:
monitoring a location of the electric vehicle;
monitoring the temperature of an electric propulsion system within the electric vehicle;
accessing historical data of driving patterns for the electric vehicle;
accessing one of
a cell phone,
smart phone,
tablet,
laptop computer, and
smart watch belonging to the operator of the vehicle, and
using GPS capability within the one of
the cell phone,
smart phone,
tablet,
laptop computer, and
smart watch to monitor the location of the operator of the electric vehicle relative to the location of the electric vehicle;
identifying a condition that indicates imminent usage of the electric vehicle by:
monitoring movement of the electric vehicle to a destination,
identifying the destination, and predicting how long the operator of the electric
vehicle will remain at the destination by accessing information from the
internet, identifying the nature of the activity at the destination, and
calculating an average length of time for the identified activity to conclude based on data from the internet; and
accessing the one of the cell phone, smart phone, tablet, laptop computer, and smart watch belonging to the operator of the vehicle, identifying recurring planned departures from a personal calendar, and predicting future departures based on data from the personal calendar;
comparing the temperature of the electric propulsion system of the electric vehicle to a pre-determined preferred operating temperature; and
sending a prompt to the operator of the electric vehicle suggesting that pre-conditioning of the electric vehicle may be appropriate when the temperature of the electric propulsion system is below a pre-determined preferred operating temperature.

2. The method of claim 1, further including identifying a condition that indicates imminent usage of the electric vehicle by:
monitoring the arrival of the electric vehicle at a public transportation hub;
monitoring movement of the operator of the electric vehicle from the public transportation hub to at least one location distant from the public transportation hub, while the electric vehicle remains located at the public transportation hub; and
monitoring the return of the operator of the electric vehicle to the public transportation hub.

3. The method of claim 2, wherein monitoring the arrival of the electric vehicle at a public transportation hub, includes monitoring the arrival of the electric vehicle at one of an airport, a bus depot, a train station, car rental agency, and a cruise ship dock.

4. The method of claim 1, further includes:
   accessing the one of a cell phone, smart phone, tablet, laptop computer, and smart watch belonging to the operator of the vehicle and identifying travel plans from the operator's personal calendar or uploaded itineraries; and
   wherein, monitoring the return of the operator of the electric vehicle to the public transportation hub further includes predicting the return of the operator of the electric vehicle to the public transportation hub based on data from the operator's personal calendar and uploaded itineraries.

5. The method of claim 1, further including identifying a condition that indicates imminent usage of the electric vehicle by:
   monitoring movement of the electric vehicle to a destination;
   accessing the personal device;
   identifying travel plans from a personal calendar or uploaded itineraries on the personal device; and
   predicting how long the operator of the electric vehicle will remain at the destination based on data from the personal calendar and uploaded itineraries.

6. The method of claim 1, further including identifying a condition that indicates imminent usage of the electric vehicle by:
   prompting the operator of the electric vehicle for a planned departure time;
   receiving input from the operator of the vehicle of the planned departure time; and
   predicting how long the operator of the electric vehicle will remain at the destination based on the planned departure time received from the driver of the electric vehicle.

7. The method of claim 1, wherein predicting how long the operator of the electric vehicle will remain at the destination further includes:
   accessing historical data;
   identifying past instances where the electric vehicle and the operator traveled to the destination;
   calculating an average time that the operator spends at the destination; and
   predicting how long the operator of the electric vehicle will remain at the destination based on the average time the operator of the electric vehicle spends at the destination.

8. The method of claim 1, wherein predicting how long the operator of the electric vehicle will remain at the destination further includes:
   accessing the operator's personal device;
   monitoring financial transactions and electronic payments made by the operator using the personal device;
   identifying a payment made at the destination; and
   predicting how long the operator of the electric vehicle will remain at the destination based on identifying a payment made by the operator at the destination.

9. The method of claim 1, wherein predicting how long the operator of the electric vehicle will remain at the destination further includes:
   detecting when the electric vehicle is plugged in at a charging station;
   monitoring when charging of the electric vehicle stops; and
   predicting how long the operator of the electric vehicle will remain at the charging station based on charging of the electric vehicle stopping.

10. The method of claim 1, wherein predicting how long the operator of the electric vehicle will remain at the destination further includes:
    detecting when the electric vehicle is parked at a public parking facility;
    accessing a parking application on the operator's personal device;
    monitoring when a pre-paid parking time will expire; and
    predicting how long the operator of the electric vehicle will remain at the charging station based on pending expiration of the pre-paid parking time.

11. The method of claim 1, further including identifying a condition that indicates imminent usage of the electric vehicle by:
    identifying patterns of past recurring departures from the historical data; and
    predicting future departures based on patterns of recurring past departures.

* * * * *